June 14, 1932.    W. N. BOOTH    1,863,464
TIRE CARRYING RIM
Filed Jan. 14, 1929
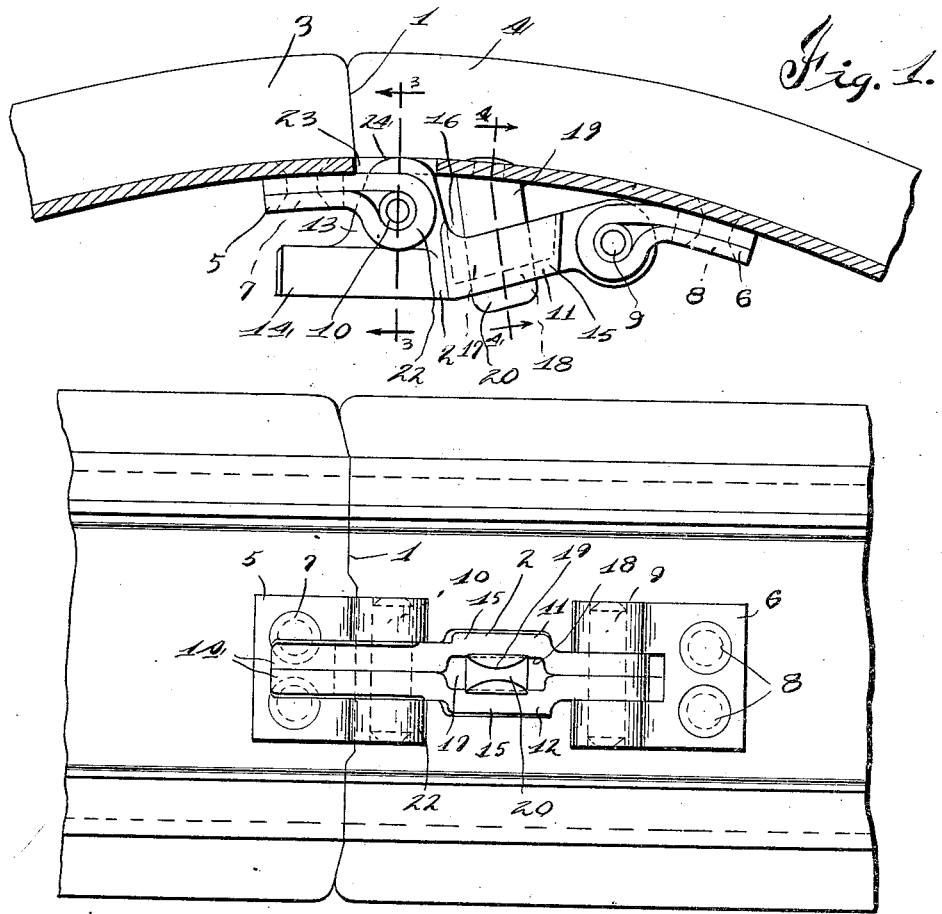
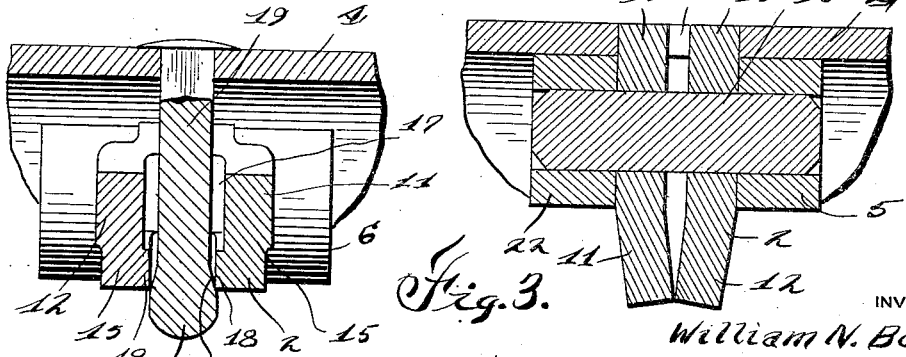
INVENTOR
William N. Booth
BY
ATTORNEYS Patented June 14, 1932

1,863,464

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

TIRE CARRYING RIM

Application filed January 14, 1929. Serial No. 332,540.

The invention relates to tire carrying rims and refers more particularly to rims of the transversely split type. One of the objects of the invention is to so construct the link for contracting and expanding the rim that it may be flexed to effect the locking of the rim in expanded or operative position without setting the metal forming the link. Another object is to so mount and construct the link that looseness or play of the link is avoided. A further object is to provide means upon the link for laterally aligning the rim ends. With these as well as other objects in view, the invention resides in the novel features of construction and combinations and arrangements of parts as more fully hereinafter set forth.

In the drawing:—

Figure 1 is a sectional elevation of a rim embodying my invention;

Figure 2 is an inside plan thereof;

Figures 3 and 4 are cross sections respectively on the lines 3—3 and 4—4 of Figure 1.

The tire carrying rim embodying my invention is transversely split at 1 so that it may be contracted and expanded to dismount or mount a tire. This rim is adapted to be mounted upon a wheel body and more particularly a channel-shaped felly. To facilitate contracting the rim, I have provided the link 2 which is pivotally connected to the rim ends 3 and 4 by means of the hinge members or pivotal mountings 5 and 6 respectively. The hinge member 5 is rigidly secured to the inner face of the base of the rim end 3 by means of the rivets 7 adjacent to the split 1 and is adapted to overlap the base of the other rim end 4.

The hinge member 6 is rigidly secured to the inner face of the base of the rim end 4 as by means of the rivets 8 at a greater distance from the split 1 than the hinge member 5. The link 2 is pivotally connected at one end to the hinge member 6 by means of the pin 9 and is pivotally connected intermediate its ends to the hinge member 5 by means of the pin 10.

The link 2 comprises the resilient metal bars 11 and 12, each of which has the outwardly extending ear 13 through which the pin 10 extends, the portion 14 forming an extension beyond the ear and the portion 15 intermediate the pins 9 and 10, there being the recess 16 between the ear and the last mentioned portion to provide for more complete contracting of the rim than would otherwise be possible if the recess were lacking. The portions 15 are laterally offset or spaced from each other to form the opening 17 and the inner edges of these portions are formed with the projections 18 extending toward each other so that the width of the opening at its inner end or at the inner edges of the bars is less than the width of the opening at its outer end or at the outer edges of the bars. 19 is a stud rigidly secured to and extending inwardly from the base of the rim end 4 and having at its inner end the head 20 connected to the body of the stud by the inclined shoulders 21, the end of this head being preferably rounded. The width of the head is substantially the same as the width of the opening 17 at its outer end, but is greater than the width of the opening at its inner end and the length of the stud is such that its shoulders 21 engage the inner edges of the bars when the rim is in expanded or operative position.

The portions 14 of the bars are spaced inwardly from the base of the rim end 3 a sufficient distance to provide for their engagement by a suitable socket wrench. To provide for flexing of the bars when passing over the head of the stud and at the same time to prevent looseness or play of the bars the portions 14 are formed to incline or converge toward their inner edges where they normally contact, the ears 13 being slightly spaced and engaging the barrel portions 22 of the hinge member 5.

By reason of the above construction, the head 20 of the stud 19 operates to flex the bars sufficiently to pass through the opening 17 formed thereby by engaging portions of the bars inwardly beyond the line connecting the axes of the pins 9 and 10 so that setting of the metal of which the bars are formed is avoided. Also by reason of the extension portions of the bars being inclined and contacting at their inner edges, looseness or play of the bars relative to the hinge member adjacent the split is avoided.

For the purpose of assisting in laterally aligning the rim ends 3 and 4, the ears 13 of the bars are extended outwardly beyond the pin 10 to engage in the peripherally elongated opening 23 formed in the base of the rim end 4 adjacent to the split 1, these extensions having the rounded edges 24 arranged to clear the ends of the elongated opening upon swinging of the link about its pivots so that the opening may be made as short as possible. With this arrangement, the link will effectively laterally align the rim ends 3 and 4, since it is connected to one rim end adjacent to the split and engages in an opening in the other rim end also adjacent to the split.

What I claim as my invention is:

1. The combination with a transversely split rim, of a link pivotally connected to the rim ends comprising bars having resilient portions spaced from each other to form an opening with a width between their inner edges less than that between their outer edges, and a member extending inwardly from one rim end and adapted to extend through the opening, said member having a head of greater width than that of the opening between the inner edges of the bar portions and of substantially the same width as that of the opening between the outer edges of the bar portions, said head being adapted to extend inwardly beyond said bars when the rim is in operative position.

2. The combination with a transversely split rim and pins upon the rim ends, of a link comprising resilient bars through which said pins extend, said bars having portions inwardly beyond one of said pins converging into contact with each other and also having portions intermediate said pins spaced from each other to form an opening with a width at its inner end less than that at its outer end, and a stud extending inwardly from one rim end and adapted to extend through the opening, said stud having a head of approximately the same width as that of the opening at its outer end and greater than that of the opening at its inner end, said head being adapted to extend inwardly beyond said bars when the rim is in operative position.

3. The combination with a transversely split rim, of a member extending inwardly from one rim end and having an enlarged head portion, a link pivotally connected to the rim ends upon opposite sides of said member and having flexible portions spaced from each other to form an opening of varying width for receiving said member when the rim is in operative position with the head portion of the member extending inwardly beyond the flexible portions of said link, the outer portions of said opening being of a sufficient width to freely receive the enlarged head portion and the inner portions of said opening having width substantially less than the width of said head portion whereby the latter operates to flex the flexible portions aforesaid of the link when the rim is moved to its various positions.

4. The combination with a transversely split rim, of a link having one end pivotally connected to the base of the rim adjacent one of the rim ends and extending inwardly from the base of the rim in spaced relation thereto, an outwardly extending projection on the link pivotally connected to the other of said rim ends and engageable in an opening formed in one of the latter ends for normally insuring registration of said ends, and a member projecting inwardly from said rim end engageable with the link intermediate the pivotal connections thereof to the rim for latching said end portions in registration.

5. The combination with a transversely split rim, of a connection between the rim ends including a link spaced inwardly from the base of the rim and having one end pivotally connected to the base of the rim adjacent one of the ends of the latter, an extension projecting outwardly from the link intermediate the ends thereof pivotally connected to the other end of the rim and engageable with an opening in one of the end portions for normally insuring registration of said ends, the free end of said link projecting beyond the extension being adapted for engagement with a suitable tool, and a member extending inwardly from the base of the rim and engageable with portions of the link between the pivotal connections thereof to the rim for normally resisting operation of said link to separate the ends of the rim.

In testimony whereof I affix my signature.

WILLIAM N. BOOTH.